J. BANNEYER.
ELECTRIC ALARM.
APPLICATION FILED JULY 7, 1913.
1,239,450.
Patented Sept. 11, 1917.
3 SHEETS—SHEET 1.
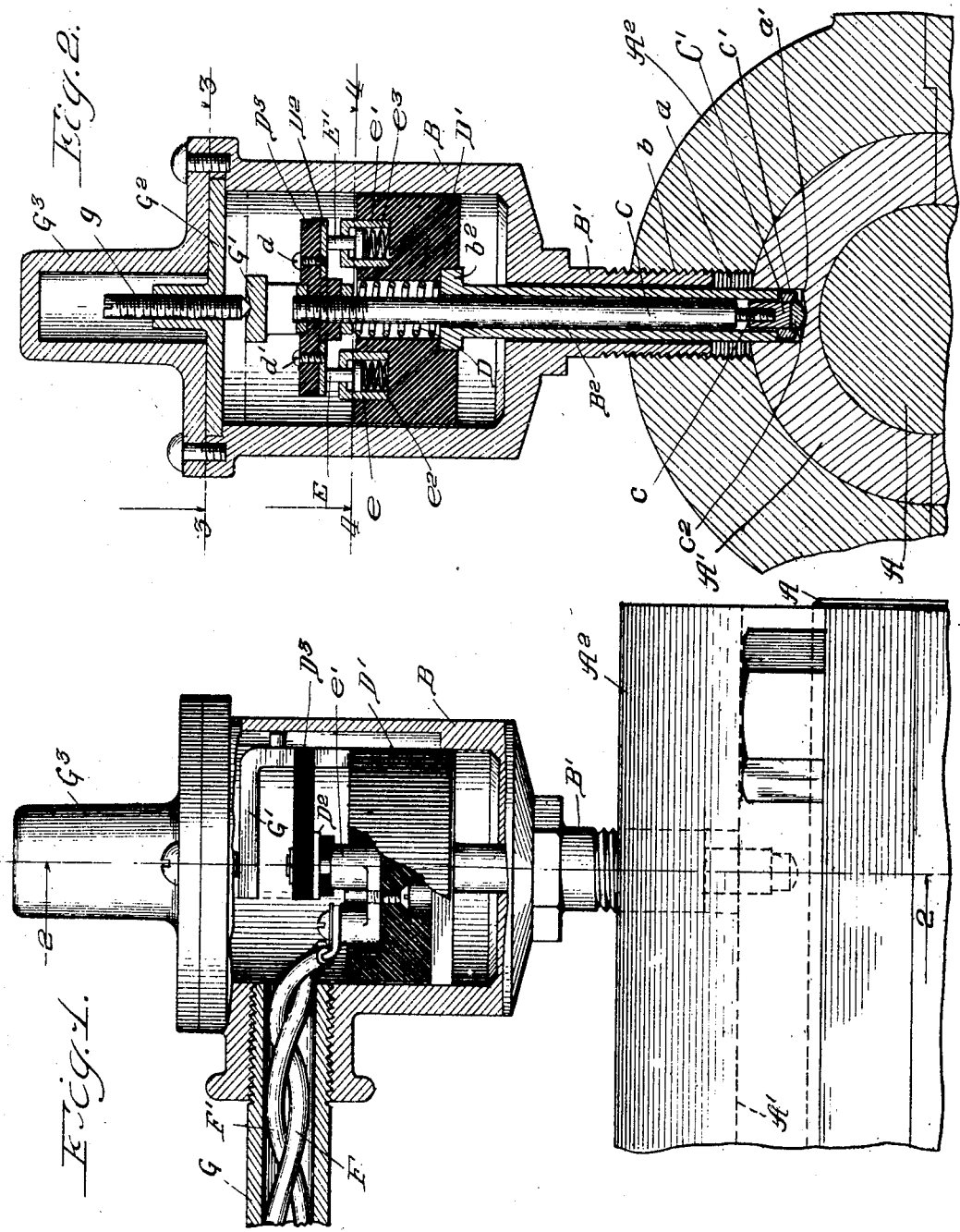

J. BANNEYER.
ELECTRIC ALARM.
APPLICATION FILED JULY 7, 1913.
1,239,450.
Patented Sept. 11, 1917.
3 SHEETS—SHEET 2.
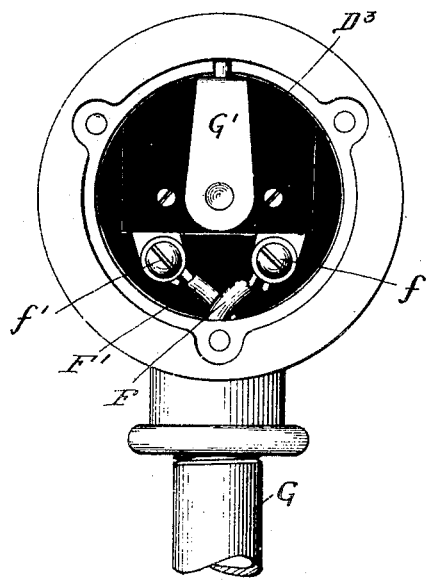
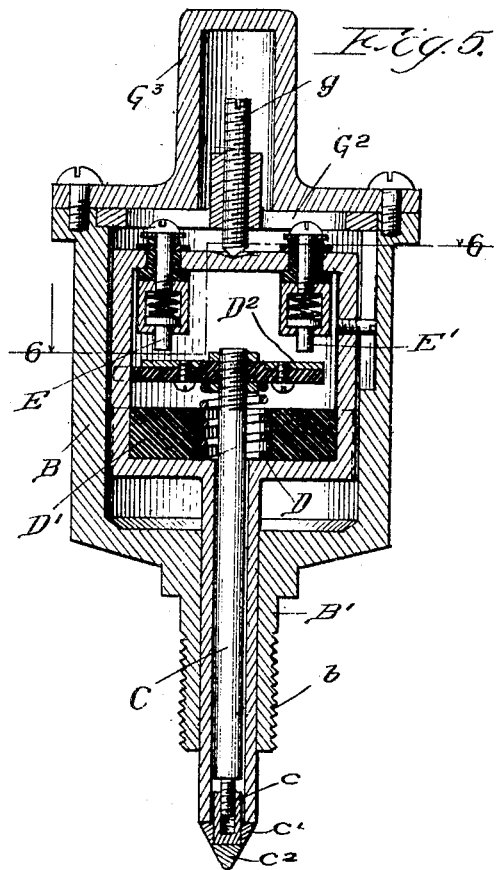
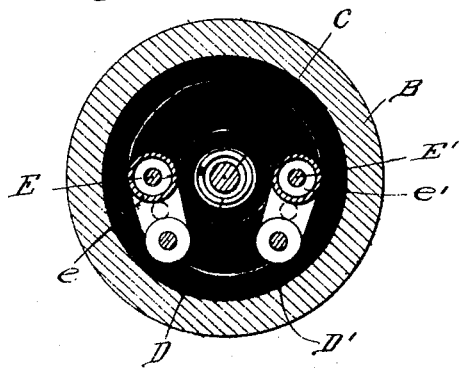
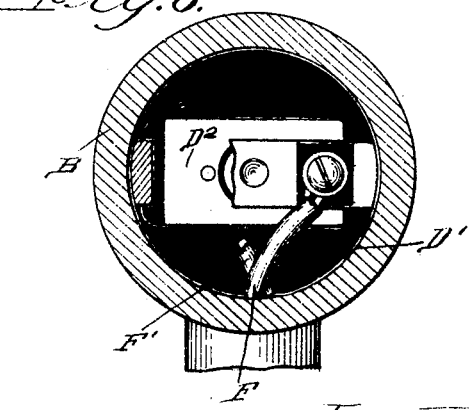

J. BANNEYER.
ELECTRIC ALARM.
APPLICATION FILED JULY 7, 1913.
1,239,450.
Patented Sept. 11, 1917.
3 SHEETS—SHEET 3.
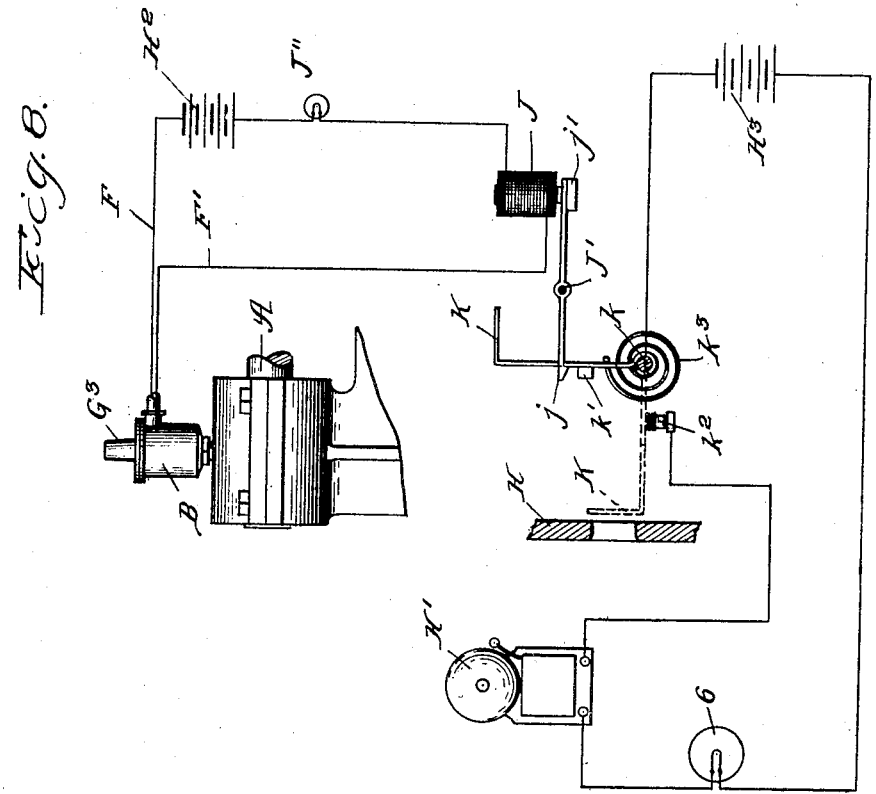
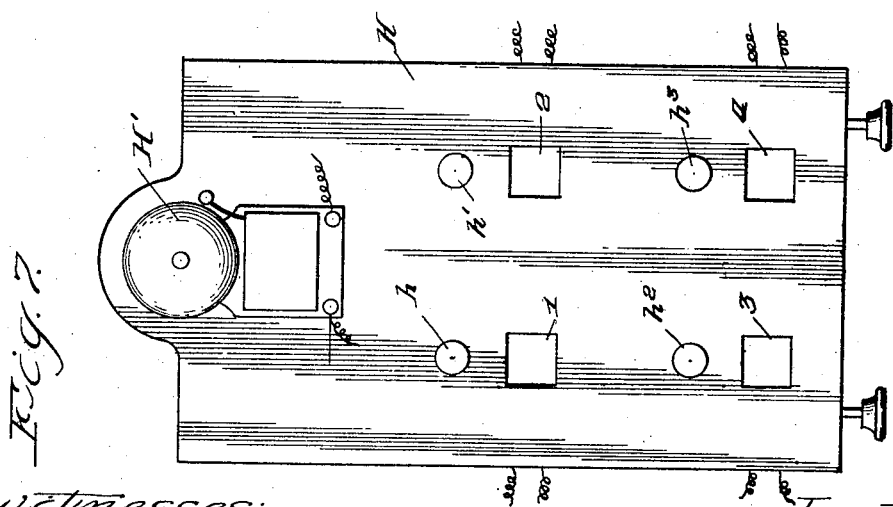

UNITED STATES PATENT OFFICE.

JOSEPH BANNEYER, OF CHICAGO, ILLINOIS.

ELECTRIC ALARM.

1,239,450.  Specification of Letters Patent.  Patented Sept. 11, 1917.

Application filed July 7, 1913. Serial No. 777,713.

*To all whom it may concern:*

Be it known that I, JOSEPH BANNEYER, a subject of the Emperor of Germany, residing at Chicago, Illinois, have invented certain new and useful Improvements in Electric Alarms, of which the following, taken in connection with the drawings, is a description.

My invention has for its object the production of an automatically operated electric alarm designed to be used with any kind of machinery operated at a rate of speed sufficient to overheat the bearings, and it is so arranged that the detecting mechanism may be readily applied to a bearing without altering the construction thereof. I contemplate its use also in connection with a steam valve in giving an alarm to stop an engine.

A further object of my invention is to provide an apparatus of this kind which may be connected electrically with an annunciator which is arranged at any place convenient for an attendant to observe, whereby when the bearing becomes too hot, the effect had upon the apparatus herein described will be to sound or indicate an alarm whereby the attendant is immediately advised of the overheated condition of the bearing.

With these and other objects in view, the invention consists in the construction and arrangement of an electric circuit and detecting mechanism hereinafter more fully described, illustrated in the accompanying drawings, and pointed out in the claims hereto appended; it being understood that various changes in the form, proportion, size and minor details of construction within the scope of the claims may be utilized without departing from the spirit of my invention. In the accompanying drawings forming part of this specification I have illustrated what I now consider the preferred form of my construction, although the same may be carried into effect in other ways without in the least departing from the spirit thereof, and in these drawings:

Figure 1 is a side elevation of my invention with the casing partly in section;

Fig. 2 is a central vertical sectional view through the device, showing the circuit closed, taken on line 2—2 of Fig. 1.

Fig. 3 is a view taken on the line 3—3 of Fig. 2;

Fig. 4 is a sectional view taken on line 4—4 of Fig. 2;

Fig. 5 is a central sectional view similar to Fig. 2 illustrating the mechanism with the circuit open;

Fig. 6 is a view taken on line 6—6 of Fig. 5;

Fig. 7 is a plan view of the annunciator; and

Fig. 8 illustrates the system of wiring connecting the alarm with the annunciator.

In carrying out my invention I contemplate utilizing my construction in connection with an annunciator having connection with the detecting mechanism of my device through either an open or closed circuit, and in the drawings I have illustrated in Fig. 2 the closed circuit form of construction, and in Fig. 5 the open circuit form of construction.

Referring to Fig. 2 A represents the axle, surrounded by the sleeve A' of Babbitt or other bearing metal and the outer cast iron casing $A^2$, all of which may be of the usual well known construction.

The detecting mechanism of my construction is inclosed within a metal casing B having a reduced elongated tubular projection B' extending from the bottom thereof, which is exteriorly screw threaded as at $b$. $G^3$ is a cover having engagement with the casing B, which covers and incloses the operative mechanism.

This screw threaded tube B' is engaged and supported in a bore in the sleeve $A^2$ and extends preferably to the sleeve A' forming part of the bearing.

Arranged inside of this tubular projection B' is a sleeve $B^2$ having a collar $b^2$ at the upper end thereof. This sleeve extends downwardly through the tubular extension B' into a bore $a$ in the casing $A^2$.

C is a spindle incased in the sleeve $B^2$. This spindle is reduced at the lower end thereof $c$, and is screw-threaded. Engaging with this screw-threaded end $c$ of the spindle is a cap or nut C', which is provided with an interiorly screw-threaded socket which receives the threaded portion $c$ of the spindle C. The downward projecting end of this cap C' is reduced in diameter and extends to the point of the tip $c^2$, which tip is the shape of an inverted cone. A collar or washer $c'$ of larger diameter than the opening in the tube $B^2$ bears against the end of said tube. The tip $c^2$ of the cap C is formed of solder or other fusible material, which being in close contact with the bearing is more quickly affected by the heat generated at the bearing, and when sufficiently heated will melt, thereby releasing the spindle C to set into operation the alarm as will be hereinafter described.

Surrounding the spindle C inside of casing B is a coiled spring D, and surrounding both the spindle and the spring is the insulating material $D'$.

Mounted on the spindle C is a contact plate $D^2$ and a strip of insulating material $D^3$, which are secured together by the screws $d$, $d'$.

E and $E'$ are spring plungers, supported in the housings $e$, $e'$. The plungers are seated upon coiled springs $e^2$, $e^3$. Circuit wires, F, $F'$ are secured at $f$, $f'$ in the usual manner, and extend through a conduit G leading to an annunciator or electrical apparatus hereinafter explained.

$G'$ is a yoke which is supported upon the sleeve $B^2$ and extends above the center of the contact plate and insulator $D^2$, $D^3$, respectively.

A plate $G^2$ is secured to the top of the casing B to close the same. Extending through this plate is a set screw $g$ which comes in contact with the top of the yoke $G'$ and holds the same firmly in position. This screw is adjustable to regulate the length of the spindle which projects through the casing. A cover $G^3$ is secured above the plate and incloses the entire mechanism.

Referring now to Figs. 7 and 8, H represents the annunciator, $H'$ the bell, $h$, $h'$, $h^2$, $h^3$, the lamps corresponding to four bearings which may be numbered 1, 2, 3 and 4. The lamps $h$, $h'$, $h^2$, $h^3$, $J''$, are normally lighted when the machine is in operation.

$H^2$ and $H^3$ are batteries of well-known construction and which may be located at any point found convenient in arranging the apparatus. J is a magnet. Pivotally secured to the frame is a lever, one arm of which is provided with a latch $j$, the opposite arm of which $j'$ is weighted and held in contact with the magnet J. A drop or display indicator K is secured at $k$ to any suitable support and when not in use for displaying the number corresponding with the bearing it is held in an upright position as shown in full lines in Fig. 8, with a latch $j$ taking over one edge thereof. $k'$ is the blade of a knife switch located at any convenient point of the edge of the indicator K. $k^3$ is a coiled spring, the tension of which is exerted against the indicator K when the latch is released to force it into contact with the switch $k^2$, as shown in dotted lines in Fig. 8.

Located at a point in line with the blade $k'$ is the switch $k^2$ which will receive the blade $k$ when the latch $j$ has been released and the display plate drops to the position shown in dotted lines in Fig. 8. The indicator will then lie directly in front of one of the openings in the annunciator, and display therethrough the number of the bearing from which the alarm has been operated.

By referring to Figs. 2 and 5 of the drawings it will be observed that this construction may be arranged with the spring plungers E, $E'$, and the plate $D^2$ in contact or out of contact, the only difference being the placing of the plungers above or below the contact plate. If placed above the plate the circuit is formed and the alarm given when plate $D^3$ and the plungers E, $E'$ come into contact and if arranged as shown in Fig. 2 the alarm is given when the contact is broken by the release of the spindle at the lower end when the apparatus is installed for use in connection with the bearing as shown in Fig. 2, and display plate K shown in Fig. 8 will be in upright position. One of these plates is arranged to correspond with each bearing, and a description of one will suffice for the duplicate number.

When the bearing is becoming overheated the effect of the heat generated near the fusible point of the cone $c^2$, will be to melt the end off the cap $C'$, the melted metal running into the socket $a'$. As soon as this tip is melted the spindle C is released and the tension of the spring will carry it forwardly breaking the contact between the plungers E and $E'$ and the contact plate $D^2$, which would simultaneously deënergize the magnet J, extinguish light $J''$, allowing the weighted end $j'$ of the latch to drop down, and release the engagement of the latch with the display plate K. The spring $k^3$ exerts its tension upon the plate K, and as soon as latch $j$ is released the plate will drop downwardly into the position shown in dotted lines in Fig. 8. The blade $k$ drops into the switch $k^2$ which closes the circuit. This action simultaneously displays the number on the face of the plate through one of the openings 1, 2, 3 or 4, corresponding therewith, extinguishes the light over the number corresponding and rings the bell $H'$, sounding the alarm.

I claim:—

1. In an apparatus for rendering signals upon the excessive heating of bearings, the combination of a bearing, a fusible element normally held in close proximity to the bearing, a casing supporting an electric circuit closer comprising a movable contact element and a stationary contact element, and a yoke provided within said casing to guide the movable contact elements toward the stationary contact element when the fusible element is overheated, substantially as described.

2. In an apparatus for rendering signals upon the excessive heating of bearings, the combination of a bearing, a fusible element normally held in close proximity to the bearing, and a circuit closer comprising a stationary and a movable contact element, a spring pressed yoke arranged in operative relation with one of said contact elements, said yoke adapted to be actuated when the fusible element is melted, substantially as described.

In testimony whereof I have signed this specification in the presence of two subscribing witnesses.

JOSEPH BANNEYER.

Witnesses:
 WELLS GOODWIN,
 CHARLES I. COBB.